J. C. STRIBLING.
FRUIT-PICKERS.

No. 193,733.  Patented July 31, 1877.

WITNESSES:
C. Neveux
J. H. Scarborough

INVENTOR:
J. C. Stribling
BY

ATTORNEYS.

UNITED STATES PATENT OFFICE.

JESSE C. STRIBLING, OF PENDLETON, SOUTH CAROLINA.

IMPROVEMENT IN FRUIT-PICKERS.

Specification forming part of Letters Patent No. 193,733, dated July 31, 1877; application filed June 25, 1877.

*To all whom it may concern:*

Figure 1:
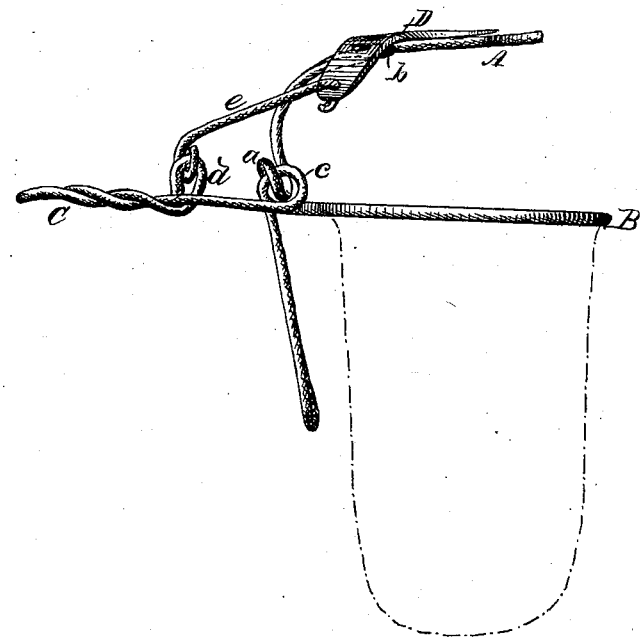
Figure 2:
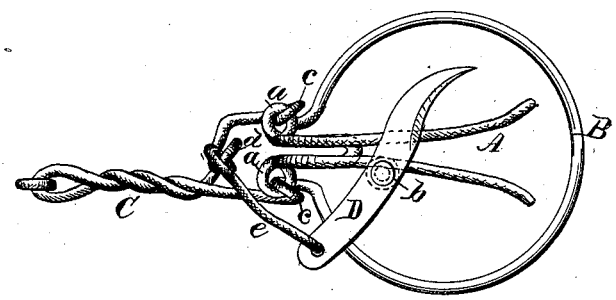

Be it known that I, JESSE C. STRIBLING, of Pendleton, in the county of Anderson and State of South Carolina, have invented a new and Improved Fruit-Picker, of which the following is a specification:

Figure 1 is a side elevation. Fig. 2 is a plan view.

Similar letters of reference indicate corresponding parts.

My invention consists in a wire frame, which is hinged to a curved wire fork attached to a pole or handle, the said frame being provided with a bag for receiving the fruit, and with a cord, by which it may be moved, and the fork is provided with a curved pivoted knife, that is connected by a link with the bag-frame, and moves across the fork whenever the said frame is moved.

In the drawing, A is a curved fork formed from wire of a suitable size, and having formed in it eyes $a$ and $b$.

A circular frame, B, for holding the fruit-bag, is provided with eyes $c$, which loop into the eyes $a$ and form hinges, upon which the frame B swings. The wire forming the frame B is twisted together to form the loop $d$ and the arm C.

D is a curved knife, which is pivoted to the fork A by a rivet passing through it, and through the eye $b$. This knife is connected by a link, $e$, with the loop $d$. The lower end of the fork A is attached to a pole or handle by means of staples, and a cord is connected with the arm C, by which it may be moved.

The manner of using the instrument is as follows: The fork A is placed astride the stem which supports the fruit, and the fruit is pulled from its stem and falls into the bag attached to the frame B. If it should be desirable to cut the stem, the arm C is moved by the string attached, which moves the knife D sufficiently to cut the stem of the fruit. The instrument is light and portable, and is inexpensive in its manufacture.

Having thus described my invention, I claim as new and desire to secure by Letters Patent—

The curved fork A and frame B, hinged together as described, and the knife D and link $e$, in combination, as herein set forth.

JESSE C. STRIBLING.

Witnesses:
W. M. BELLOTTE,
R. E. SLOAN.